United States Patent [19]

Ketcham

[11] Patent Number: 5,204,162

[45] Date of Patent: Apr. 20, 1993

[54] NON-SPHERICAL BODIES

[75] Inventor: Thomas D. Ketcham, Big Flats, N.Y.

[73] Assignee: Corning Incorporated, Corning, N.Y.

[21] Appl. No.: 770,369

[22] Filed: Oct. 3, 1991

[51] Int. Cl.⁵ .............................................. B32B 15/02
[52] U.S. Cl. ....................................... 428/192; 419/23;
428/364; 428/397; 428/398; 428/402; 428/599
[58] Field of Search ............... 428/402, 192, 364, 397, 428/398, 599; 419/23

[56] References Cited

U.S. PATENT DOCUMENTS

| | | | |
|---|---|---|---|
| 4,592,781 | 6/1986 | Cheney et al. | 264/12 |
| 4,613,371 | 9/1986 | Cheney et al. | 264/12 |
| 4,687,510 | 8/1987 | Cheney et al. | 264/12 |
| 4,743,507 | 5/1988 | Fronses et al. | 428/402 |
| 4,756,746 | 6/1988 | Kemp, Jr. et al. | 75/342 |
| 4,767,435 | 8/1988 | Omi et al. | 65/30.13 |
| 4,871,489 | 10/1989 | Ketcham | 264/9 |
| 4,940,477 | 7/1990 | Bocko et al. | 65/18.2 |
| 5,034,313 | 6/1991 | Shuman | 430/292 |
| 5,108,665 | 4/1992 | Crooker et al. | 264/6 |
| 5,108,674 | 4/1992 | Stebbins et al. | 264/65 |

Primary Examiner—Paul J. Thibodeau
Assistant Examiner—D. S. Nakarani
Attorney, Agent, or Firm—Milton M. Peterson; Clinton S. Janes, Jr.

[57] ABSTRACT

Non-spherical bodies having a circular cross-section that is 0.5–200 microns in diameter and that are longer than the cross-sectional diameter, and a method of making such bodies by reshaping non-spherical bodies. The method comprises positioning a monolayer of unsintered, deformable, spherical bodies between smooth facing surfaces on two flat formers, and applying a mild shearing force to at least one of the formers.

9 Claims, 2 Drawing Sheets

NON-SPHERICAL BODIES

FIELD OF THE INVENTION

The field is small, non-spherical bodies and the reshaping of spherical bodies into non-spherical geometries, such as barrels and cylindrical rods.

BACKGROUND OF THE INVENTION

Formation of spherical particles or bodies from ceramic materials, particularly from oxides, is well known. The particles formed may be as small as sub-micron, or may be as large as a millimeter, in diameter.

For example, spheres up to several hundred microns in diameter were produced by a sol-gel approach during redevelopment of nuclear fuel rods. At the other end of the scale, various techniques, including sol-gel techniques, are described for producing very small spherical particles on the order of a micron up to tens of microns in diameter. These techniques are described in the technical literature, and particularly patent literature. Examples are found in the following United States patents: U.S. Pat. No. 4,940,477 (Bocko et al.), U.S. Pat. No. 5,108,665 (Crooker et al.) and U.S. Pat. No. 5,108,674 (Stebbins et al.).

Characteristically, the spherical particles were produced with a wide, and often uncontrolled, range of particle sizes. My U.S. Pat. No. 4,871,489 describes a method and apparatus for producing spherical particles having a narrow size distribution. In accordance with that patent teaching, droplets are formed by forcing a thin, liquid stream of a sol through an orifice under pressure, and applying a periodic vibration to break up the stream. This is referred to as the vibrating orifice, or the Rayleigh instability, method. The droplets formed in this manner have a narrow size distribution. They may be dried to form spheres which may be in the 1–10 micron size range, although not so limited.

Spheres formed in this manner find various applications as disclosed in the patent. In addition, for some purposes, it is desirable to have bodies in other non-spherical forms. In particular, cylindrical rods, or barrel-shaped particles, may be required for such purposes as light focusing.

Accordingly, a primary purpose of the present invention is to supply such alternative, non-spherical shapes.

Another purpose is to provide a convenient method of reshaping spherical particles into such other non-spherical shapes.

SUMMARY OF THE INVENTION

One aspect of my invention is a non-spherical body having a circular cross-section and rounded, smooth ends, each of which approximates a section of a sphere, the diameter of the circular cross-section being at least 0.5 microns, but less than 200 microns and the length of the body being greater than the diameter of the circular cross-section. The bodies may have a ratio of the body length to the diameter of the circular cross-section that is up to about 25:1, preferably not over about 10:1. They may be in the shape of cylindrical rods, or may be barrel-shaped. They may be sintered ceramic bodies, or composed of one or more metal oxides, and may be reshaped spherical bodies.

Another aspect of my invention resides in a method of reshaping spherical particles into alternative, non-spherical, geometrical shapes, the method comprising positioning a monolayer of unsintered, deformable, spherical particles between smooth facing surfaces on two flat formers and applying a mild shearing force to at least one of the formers, the force applied being sufficient to alter the shape of the spherical particles without loss of their particulate character. In one embodiment, the formers are flat sheets of glass. In another, the spherical particles may be produced by the method taught in my prior patent.

PRIOR ART

In addition to the patent literature already noted, particularly U.S. Pat. No. 4,871,489, Applicant notes the following United States Patent:

U.S. Pat. No. 4,767,435 (Omi et al.) describes a method of making rod-shaped microlenses with a refractive index gradient wherein a glass rod is phase-separated, leached, impregnated and consolidated. The lenses do not have the geometry or the size of the lenses described here.

BRIEF DESCRIPTION OF THE DRAWINGS

In the accompanying drawings.

DESCRIPTION OF THE INVENTION

Figure 1:
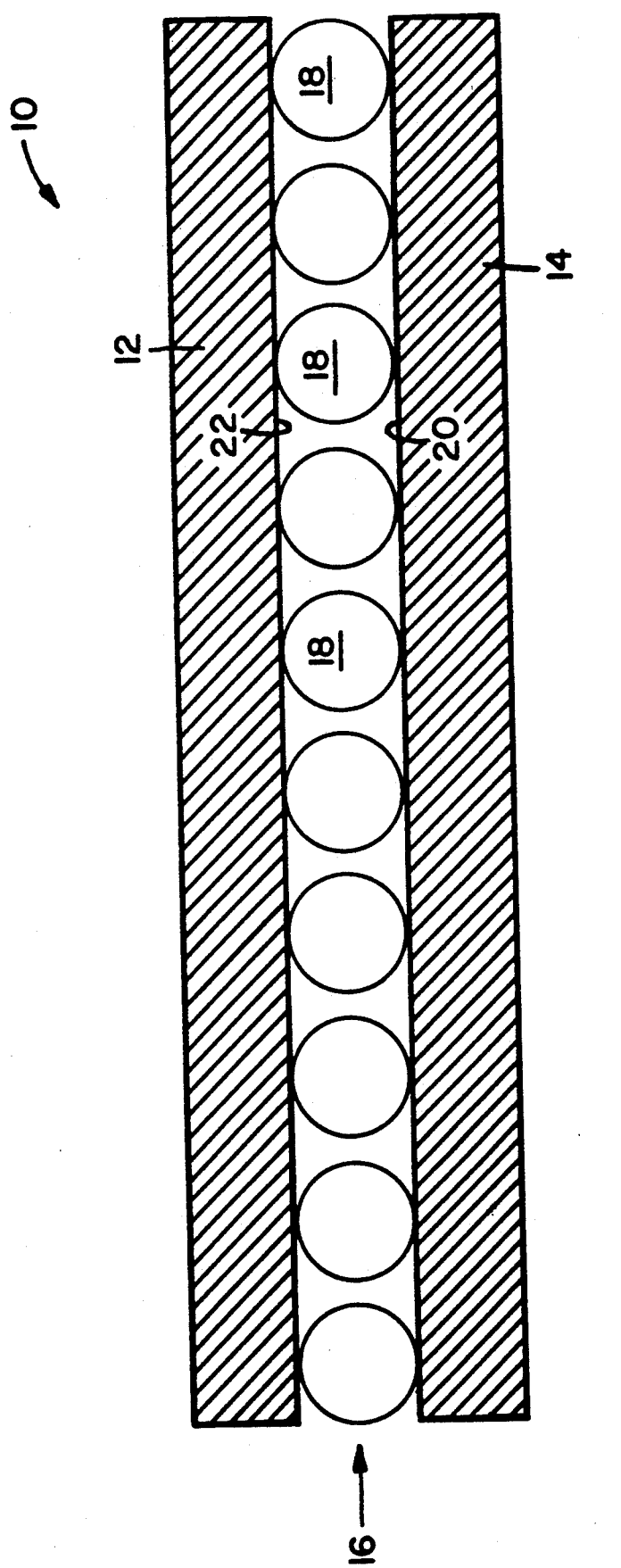
FIG. 1 is a side view of a simplified assembly for practicing the method of the invention.

The present invention is concerned with reshaped spherical bodies having non-spherical geometries. The reshaped, non-spherical bodies may take various shapes. However, the invention is described with reference to cylindrical rods and barrel-shaped bodies, since current interest focuses primarily on such geometries. Particles having these shapes find application as lubricity additives or aids, and for light focusing means, among other uses.

The non-spherical bodies may be composed of various materials, largely depending on the ultimate use or intended purpose. Thus, any material that can initially be formed as a deformable, spherical particle is contemplated. This includes metals, glasses, plastics and ceramics. Current interest resides in ceramic materials, such as $ZrO_2$, $TiO_2$, $SiO_2$, $Al_2O_3$ and oxide mixtures, a well as in carbon compounds.

The spherical particles may be produced by any of the techniques extant in the art. For example, they may be produced by sol-gel techniques as described in the patents noted earlier. However, for most purposes, it is desirable to employ particles falling within a narrow size distribution range.

My prior U.S. Pat. No. 4,871,489, is directed to producing spherical particles in a narrow size distribution range, for example, 80% within a 70–250% range around a base particle diameter. The base particle diameter may be up to about 200 microns. However, a range of 0.5 to 50 microns is preferred.

The method of the patent is disclosed as being an improvement in the production of droplets, and particles therefrom, by the Rayleigh instability technique. The method is particularly useful, not only because of the controlled, narrow size distribution, but also because it produces a plurality of particles simultaneously, and hence has production potential. Accordingly, the present invention, while not so limited, is described with respect to reshaped spherical bodies, the spherical bodies being produced by the method of the —489 patent. The teachings of that patent are incorporated herein by reference.

In general terms, the method of the patent is described as forcing a liquid, for example, an aqueous sol of an oxide precursor, under pressure through an orifice plate having a plurality of orifices. The resultant liquid streams are then vibrated to break the streams into liquid droplets. This may be by vibrating the orifice periodically. Preferably, an electric charge is applied to the droplets to cause the streams to diverge, and thereby minimize coalescence of the droplets.

The droplets, thus formed, are processed to remove the liquid and form solid, spherical bodies. This may involve entrainment in a drying gas, as well as thermal means, such as heating or freezing. For present purposes, the spherical bodies will normally be in a solid state, but must still be readily deformable. In particular, the spherical bodies cannot be sintered prior to reshaping.

The method of the present invention basically comprises; (a) covering a smooth upper surface of a flat forming body with a monolayer of unsintered, deformable, spherical bodies; (b) positioning a second forming body over the monolayer of spherical bodies with a smooth surface facing the bodies; and (c) applying a mild shearing force to at least one of the formers. The force applied is sufficient to alter the shape of the bodies, but not sufficient to crush, flatten, coalesce, or otherwise cause loss of their particulate nature.

Spherical bodies suited to reshaping will generally have diameters in the range of 0.5 to 200 microns. The bodies reshaped therefrom will have a circular cross-section and rounded, smooth ends, each of which approximates a section of a sphere. The diameter of that cross-section will be at least 0.5 microns, but less than 200 microns, preferably less than 50 microns. The length of the body will necessarily be somewhat greater than the diameter of the circular cross-section. The ratio of the length to the diameter of the circular cross-section may be up to about 25:1, but preferably not over 10:1.

FIG. 1 in the accompanying drawing is a side view of a simple assembly 10 that might be used to practice the invention. Assembly 10 consists of two former plates 12 and 14 which may, for example, be smooth glass sheets, or flat metal plates polished on one major surface. The term "former" encompasses any flat, solid body that has at least one relatively smooth major surface that can convey a shearing force without itself distorting, or marring the surface on particles being deformed.

In practice, a monolayer 16 of spherical bodies 18 is applied over a smooth major surface 20 on bottom former 14. The bodies in this layer are preferably closely spaced, but not so close as to interfere with reshaping. In other words, they are sufficiently spaced to permit the bodies to take the desired new geometry.

Upper former 12 is then placed over the monolayer with a smooth major face 22 facing the monolayer 16. A mild shearing force is then applied, either to upper former 12, or to both formers, so that the formers move relative to each other. The force is sufficient to cause deformation of the spheres 18 in monolayer 16, but insufficient to crush, flatten or coalesce them. Preferably, the force applied does not exceed about 10 psi. For example, using a layer of bodies between two glass slides, mild finger pressure was sufficient to cause the desired deformation.

In the operation just described, it was observed that the glass slides flexed under pressure. This caused a variable spacing between the slides, the area where pressure was applied having a reduced spacing. In this area, the spherical bodies were deformed to cylindrical rods of uniform diameter and length. In the regions of indirect pressure, where the spacing was slightly larger, barrel shaped lenses were observed.

Figure 2:
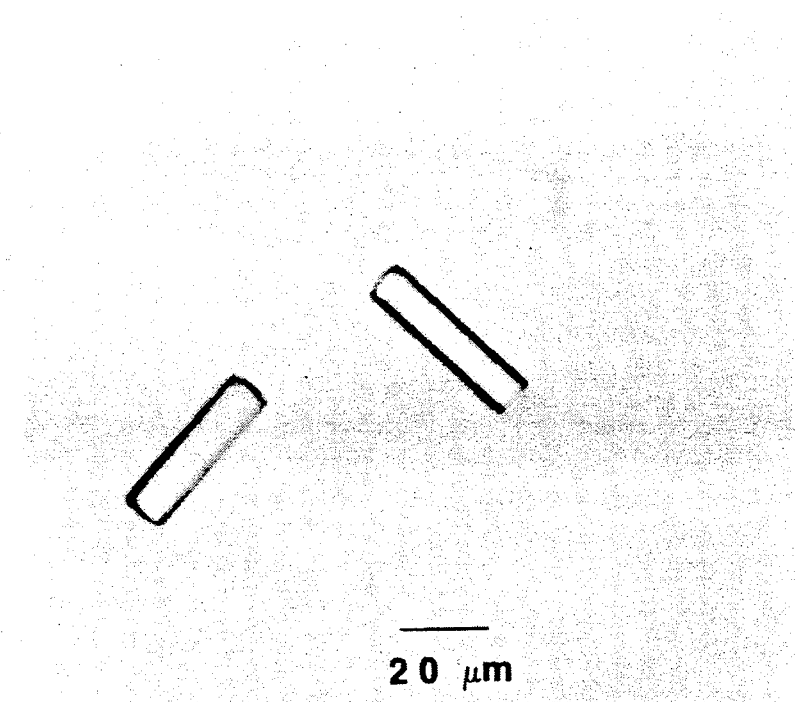
FIG. 2 is a photomicrograph showing one form of reshaped body in accordance with the invention.
Figure 3:
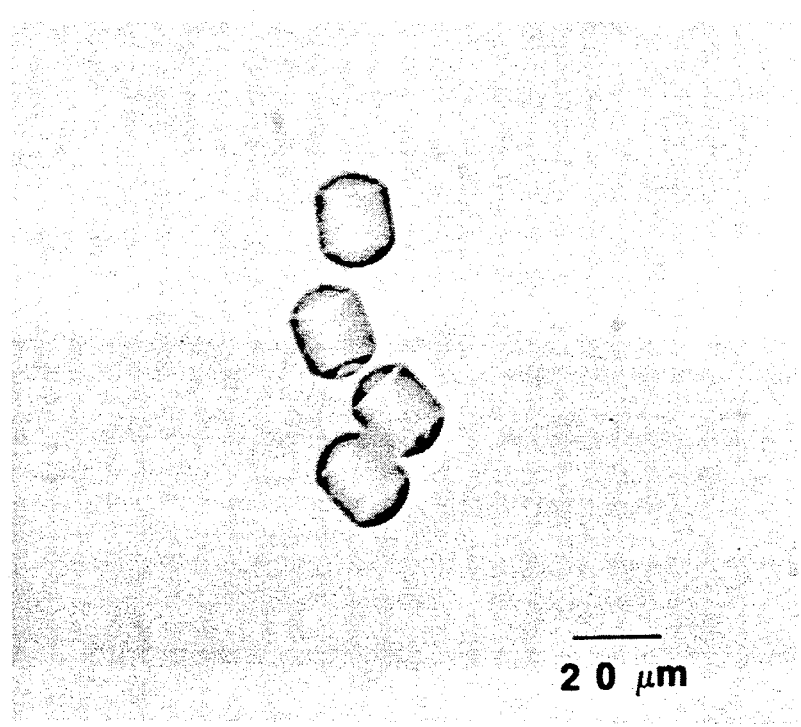
FIG. 3 is a photomicrograph showing another form of body reshaped in accordance with the invention.

FIGS. 2 and 3, in the accompanying drawings, are photomicrographs taken with a magnification of 500×. Respectively, they show cylindrical rods and barrel-shaped bodies formed from about 16 micron diameter, doped, alumina gel spheres. The alumina gel spheres were prepared from an aqueous sol of aluminum chlorohydrate doped with cerium or lanthanum at a 5% level with respect to the oxides. The spheres were formed in a gel state in the manner described in my —489 patent. The ratio of length to cross-section diameter of the cylindrical rods of FIG. 2 is approximately 5:1.

In a second experiment, microspherical bodies with a narrow, but bimodal, size distribution were again placed between glass slides. The majority of the bodies were of a single small size. However, about 25% were of a larger size, about 26% greater in diameter than the smaller bodies. When pressure was applied as before, the smaller bodies did not deform, while the larger ones took the form of barrel-shaped lenses. It is apparent the smaller microspheres performed a spacer function.

In both cases, the reshaped microspheres could be calcined or sintered without loss of their new geometries. Hence, they can be readily processed for further handling and assembly. For optical purposes, isotropic materials such as glasses, or cubic materials like magnesium aluminate spinel, are contemplated in preference to materials such as hexagonal alpha-alumina.

I claim:

1. A non-spherical, inorganic body deformed from a spherical shape to have a shape selected from the group consisting of a cylindrical rod and a barrel-shape, the body having a uniform circular cross-section and rounded, smooth ends, each of which approximates a section of a sphere, the diameter of the circular cross-section being at least 0.5 microns, but less than 200 microns, and the length of the body being greater than the diameter of the circular cross-section.

2. A non-spherical body in accordance with claim 1 wherein the ratio of the body length to the diameter of the circular cross-section is up to about 25:1.

3. A non-spherical body in accordance with claim 2 wherein the ratio is not over about 10:1.

4. A non-spherical body in accordance with claim 1 wherein the diameter of the circular cross-section is less than 50 microns.

5. A non-spherical body in accordance with claim 1 wherein the body has the shape of a cylindrical rod.

6. A non-spherical body in accordance with claim 1 wherein the body has the shape of a barrel.

7. A non-spherical body in accordance with claim 1 that is a sintered, ceramic body.

8. A non-spherical body in accordance with claim 1 that is composed of one or more metal oxides.

9. A non-spherical, inorganic body deformed from a spherical shape to have a shape selected from the group consisting of a cylindrical rod and a barrel-shape, having a uniform circular cross-section, having a length greater than the diameter of the cross-section, and being a reshaped spherical body of 0.5 to 200 microns diameter.

* * * * *